United States Patent Office 2,784,567
Patented Mar. 12, 1957

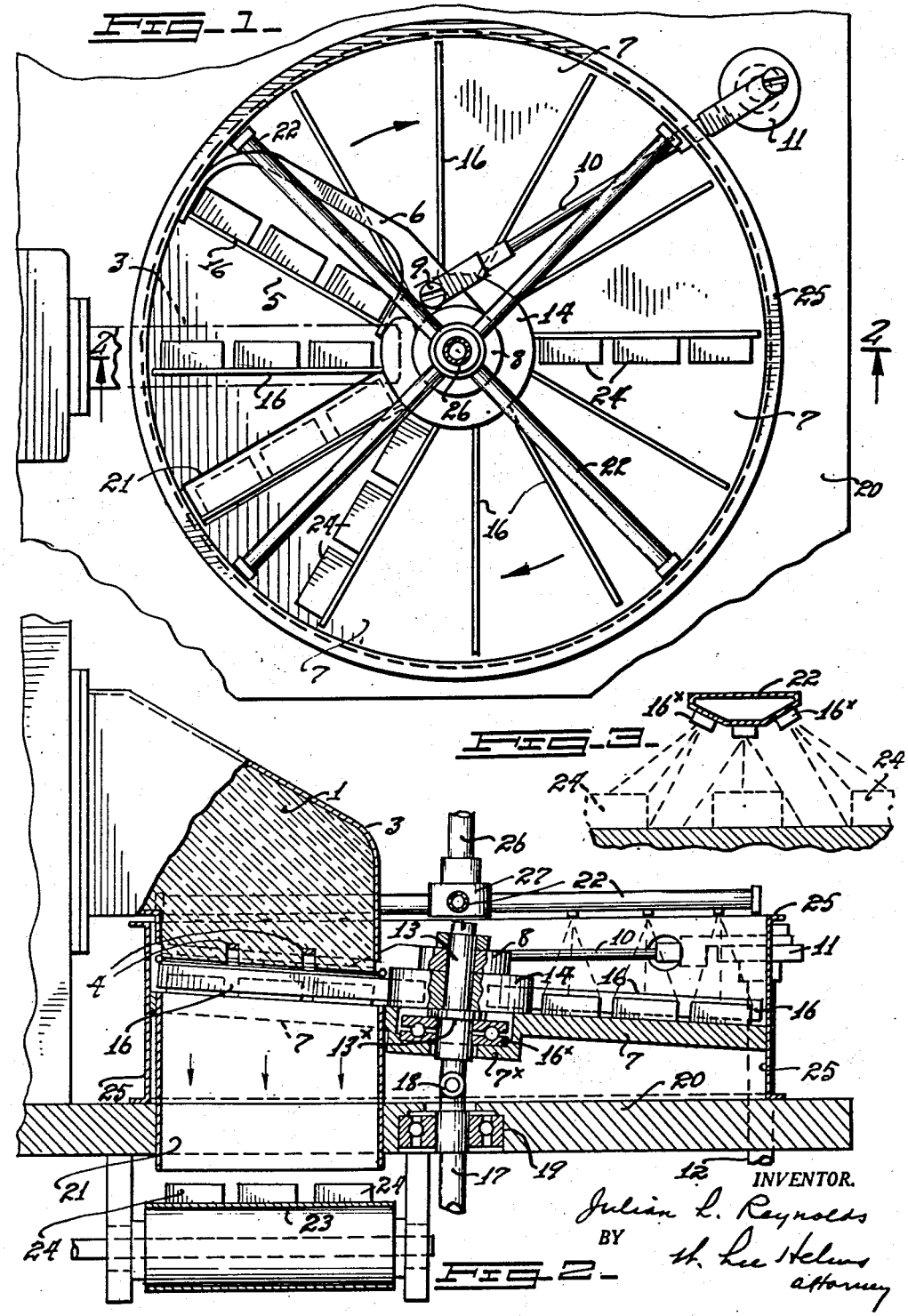

2,784,567

RAPID REFRIGERATION OF FOODSTUFFS

Julian L. Reynolds, Richmond, Va.

Application July 20, 1954, Serial No. 444,617

2 Claims. (Cl. 62—114)

The object of the present invention is to provide a method and apparatus for rapid refrigeration of foodstuffs, either packaged or in the form of material in plastic form, such for example as ice cream units and allied materials. The characteristic of the invention is that the foodstuff units are deposited upon a rotary table-supported surface, preferably of high heat conduction and are carried in a rotary path to a point of discharge at which the frozen units are discharged. The specific example illustrated in the drawing embodies a fixed table, means for discharging one or plurality of units upon the table, means for moving units in a circular path on the table to an opening therein through which the units are gravitationally dropped and means for moving the units into and out of a bath of liquid, such for example as liquid nitrogen or liquid air, the table being of high heat conduction and being brought to very low temperature by the bath. In the said illustrated embodiment, the bath is maintained by sprays of the refrigerant, which sprays directly discharge onto the upper and side surfaces of the units under refrigeration.

By the method above described, the bath may be maintained in relatively small volume which need not cover the tops of the units to be frozen, the spray feed discharging onto the tops of the units as they move toward the bath, although, if desired, the bath may completely cover the units.

The invention will be described with reference to the accompanying drawings, in which:

Fig. 1 is a plan view of an embodiment, partly broken away;

Fig. 2 is a vertical section on the line 2—2, Fig. 1;

Fig. 3 is a schematic view, being a section through one of the spray pipes showing by dotted line the action of the refrigerant spray in its contact with the units under refrigeration.

Referring to the drawings, and particularly Fig. 2, it will be seen that the embodiment therein shown is directed toward the solidification and hardening of a plastic ice cream or allied mix indicated at 1. This mix passes from one or more continuous freezers and is divided by a forming throat 3 into three sections separated by the walls 4 at the throat outlet. As the plastic mix passes downwardly from the throat, three sections are cut off by the blade 5 of a reciprocating knife 6 and the bar-like cut sections fall upon an annular table 7.

The specific construction of the cutting mechanism may be as desired, the form shown in Fig. 1 of the drawing being illustrative only. The hub 8 of the knife is pivotally connected at 9 and actuating rod 10 driven by eccentric connection with a rotor disk 11 to the top of the rotary shaft 12 shown in dotted lines, Fig. 2. The cutter knife hub 8 oscillates on a stub shaft 13. To shaft 13 is fixed a larger hub 14 which carrys a plurality of pusher blades 16. Stub shaft 13 carries an intermediate collar 13x below which is a bearing 16x in a depressed housing 7x provided by the table 7. Stub shaft 13 is rotated by a drive shaft 17 through a flexible connection 18, shaft 17 rotating in a bearing 19 carried by horizontal support 20.

Viewing Fig. 2 with relation to Fig. 1, it will be seen that the point of discharge of the forming throat 3 is offset from a discharge opening at 21 in table 7. Thus the area of discharge of the forming throat is indicated in Fig. 1 at 3x, whereas, in a direction of movement of the pusher blade 16 the discharge opening 21 is at the rear of the forming throat discharge.

In the position of the elements shown in Fig. 1, the "knife" is in position for a fast active throw, to carry its "blade," which preferably is a heated wire, across the forming throat opening to sever three plastic sections. At the instant of cutting, one of the pusher blades will lie back of the plastic in its flow so as to act as a back stop for the action of the cutter blade or wire. Shaft 13, while timed with the discharge of the plastic from the forming throat, or rather the speed of movement thereof downwardly from the forming throat, acts with extreme rapidity, and the continuous movement of the pusher blades is permitted.

The three plastic units are moved continuously on the table 7, by reason of the intense cold of the table, which preferably is of stainless steel. The units discharged onto the table are so instantaneously refrigerated with a bottom "skin" that there is no adherence on the table and in fact what might be called a repulsion. The initially severed units pass under a first spray pipe 22 which discharges thereon liquid nitrogen, liquid air, or other refrigerant of extremely low temperature, and a succession of like sprays are effected by means of the additional spray pipes 22, the units finally being pushed through the discharge opening 21 and onto an endless belt 23 which carries them away for packing or enrobing. The spray pipes are preferably formed as shown in Fig. 3 and with inclined nozzle 16x which discharge from the top and sides of the units as they pass under the spray pipes, the units being indicated at 24.

As shown in Fig. 2, the fixed table 7 is sealed at its periphery to an annular housing 25, and the table is inclined. Thus a pool of liquid refrigerant may be maintained at the right-hand area of the table shown in Figs. 1 and 2. As the units to be frozen are moved toward the discharge table opening 21, they are brought into the bath provided by the pool and thence out of the bath so that liquid carried by them will be brought back into the pool. The liquid spray may be so regulated as to maintain the pool at any desired height, the liquid leading from a source of supply into axially disposed feed pipe 26 into manifold 27 through which the spray pipes are connected.

Although the embodiment illustrated relates particularly to rapid refrigeration of plastic units cut from a continuous flow of plastic material, such as ice cream and the like, it will be understood that in lieu thereof foodstuffs packaged in trays or boxes or other containers may be dropped onto the table in the same manner as the dropping thereof of plastic material and moved from point of reception to point of discharge, rapidly and efficiently. It will also be understood that various modifications may be made in the form and arrangement of the elements constituting the embodiment illustrated in the drawing, without departing from the spirit of the invention.

Having described my invention, what I claim and desire to secure by Letters Patent is as follows:

1. A method of freezing plastic ice cream and the like which consists in depositing successive units thereof upon an area of a table of high heat conduction, first subjecting the table and the units to a spray of low-temperature non-toxic refrigerant, draining said refrigerant into an area of said table apart from the deposition area, maintaining a pool of said drained refrigerant, moving the units from the point of deposit on the table to a point of discharge and through said pool, and discharging said units from the table.

2. In apparatus for freezing food units, an inclined table, a shaft, at least one pusher blade carried by the shaft, means for rotating the shaft so that the pusher blade is rotated adjacent the top of the table, a forming throat for a plastic foodstuff mix disposed above the table, cutter means for cutting plastic units moving downwardly from said forming throat whereby said units are dropped upon the table, and spray means disposed above the table for subjecting said table and food units carried thereby to the action of a low temperature non-toxic fluid refrigerant, said table being adapted to maintain at one end thereof a pool of the refrigerant, and each pusher arm being adapted to push the food units through said pool.

References Cited in the file of this patent

UNITED STATES PATENTS

| | | |
|---|---|---|
| 1,965,619 | Vogt | July 10, 1934 |
| 2,229,000 | Birdseye | Jan. 14, 1941 |
| 2,332,367 | Birdseye | Oct. 19, 1943 |
| 2,370,920 | Schaub | Mar. 6, 1945 |
| 2,582,789 | Morrison | Jan. 15, 1952 |
| 2,625,120 | Eddy | Jan. 13, 1953 |
| 2,646,594 | Field | July 28, 1953 |
| 2,669,195 | Pellegrino | Feb. 16, 1954 |
| 2,674,100 | Stonestreet | Apr. 6, 1954 |
| 2,700,347 | Gram | Jan. 25, 1955 |